United States Patent [19]
Oba

[11] Patent Number: 5,743,364
[45] Date of Patent: Apr. 28, 1998

[54] SLIP CONTROL SYSTEM OF LOCKUP CLUTCH

[75] Inventor: Hidehiro Oba, Numazu, Japan

[73] Assignee: Toyota Jidosha Kabushiki Kaisha, Toyota, Japan

[21] Appl. No.: 679,111

[22] Filed: Jul. 12, 1996

[30]  Foreign Application Priority Data

Jul. 17, 1995 [JP] Japan ................................ 7-179901

[51] Int. Cl.$^6$ ...................................................... F16H 61/14
[52] U.S. Cl. .............................. 192/3.3; 477/65; 477/176
[58] Field of Search .............................. 192/3.3, 3.31; 477/62, 65, 64, 67, 176

[56]  References Cited

U.S. PATENT DOCUMENTS

| 5,010,991 | 4/1991 | Tsukamoto et al. ........ 192/3.31 X |
| 5,058,716 | 10/1991 | Lippe et al. .................. 192/3.3 X |
| 5,584,370 | 12/1996 | Wakahara ......................... 192/3.3 |
| 5,611,750 | 3/1997 | Kono et al. ........................ 477/65 |

FOREIGN PATENT DOCUMENTS

| 4-331870 | 11/1991 | Japan . |
| 5-99331 | 4/1993 | Japan . |

*Primary Examiner*—Rodney H. Bonck
*Attorney, Agent, or Firm*—Oblon, Spivak, McClelland, Maier & Neustadt, P.C.

[57]  ABSTRACT

The slip control system of a lockup clutch including a lockup relay valve and a duty solenoid (50). The lockup relay valve switches the engagement state of the lockup clutch in response to the actuation of a switching solenoid. In the state in which the lockup relay valve is switched to a position for exhausting working oil out of a release side oil chamber in a torque converter, the duty solenoid receives a duty factor correspondent to the desired value of a slip magnitude as delivered from a controller (58) and then controls the quantity of exhaust of the working oil. Thus, the slip control system can attain a reduced cost and a smaller size as well as a lighter weight while being enhanced in reliability and controllability.

14 Claims, 9 Drawing Sheets

SLIP CONTROL SYSTEM OF LOCKUP CLUTCH

BACKGROUND OF THE INVENTION

1. Field of the Invention

The present invention relates to the slip control system of a lockup clutch. More particularly, it relates to a system wherein a lockup clutch is slipped and controlled in accordance with the hydraulic pressures of working oil within an engagement side oil chamber and a release side oil chamber in order that the magnitude of the slip between an input element and an output element may be brought to a desired (target) value.

2. Description of the Prior Art

Regarding motor vehicles each of which includes a fluid type transmission gear with a direct connection clutch, such as a torque converter with a lockup clutch or a fluid coupling with a lockup clutch, there have been proposed the slip control systems of the lockup clutches wherein the direct connection clutch is slipped in order to absorb, for example, the periodical torque fluctuation of an engine during the low speed drive of the motor vehicle.

In, for example, the slip control system disclosed in the official gazette of Japanese Patent Application Laid-open No. 331870/1992, the lockup clutch is slipped and controlled by a clutch switching valve and a slip control valve. More specifically, the clutch switching valve switches the engagement state of the lockup clutch by supplying working oil into one of an engagement side oil chamber and a release side oil chamber and exhausting the working oil from the other, in order that the slip magnitude between an input element and an output element may be brought to a desired value in response to a switching electromagnetic solenoid. Besides, the slip control valve performs as a pressure regulator valve which regulates the difference of pressures between the engagement side oil chamber and the release side oil chamber by employing an electromagnetic solenoid (such as a linear solenoid or the like) as a signal-pressure generation source.

The prior-art slip control system of the lockup clutch, however, has the problems that a complicated circuit arrangement is involved, that the enlarged size of the valve body (including the linear solenoid and the slip control valve) worsens the installation quality of the slip control system and increases the weight and cost thereof.

SUMMARY OF THE INVENTION

The present invention has been made in order to solve the above problems of the prior art, and has for its object to provide the slip control system of a lockup clutch which can attain a reduced cost, and the smaller size and lighter weight of a valve body.

The present invention has achieved the above object by employing the structure defined by claim 1.

According to the present invention, the lockup clutch is slipped and controlled in such a way that a quantity of a working oil to be exhausted is controlled by a duty solenoid, in a state in which the working oil is to be exhausted out of the release side oil chamber. In addition, the duty solenoid carries out the slip control by receiving the duty factor (ratio) which corresponds to the desired value of the slip magnitude between the input element and the output element and which is delivered as the output from the control means.

Thus, the linear solenoid and the slip control valve in the prior art are dispensed with, and the slip control is effected by the single duty solenoid. It is accordingly possible to attain the reduced cost of the slip control system, and the smaller size and lighter weight of the valve body.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, examples of the more practicable aspects of performance (embodiment) of the present invention will be described in detail with reference to the drawings.

Figure 1:
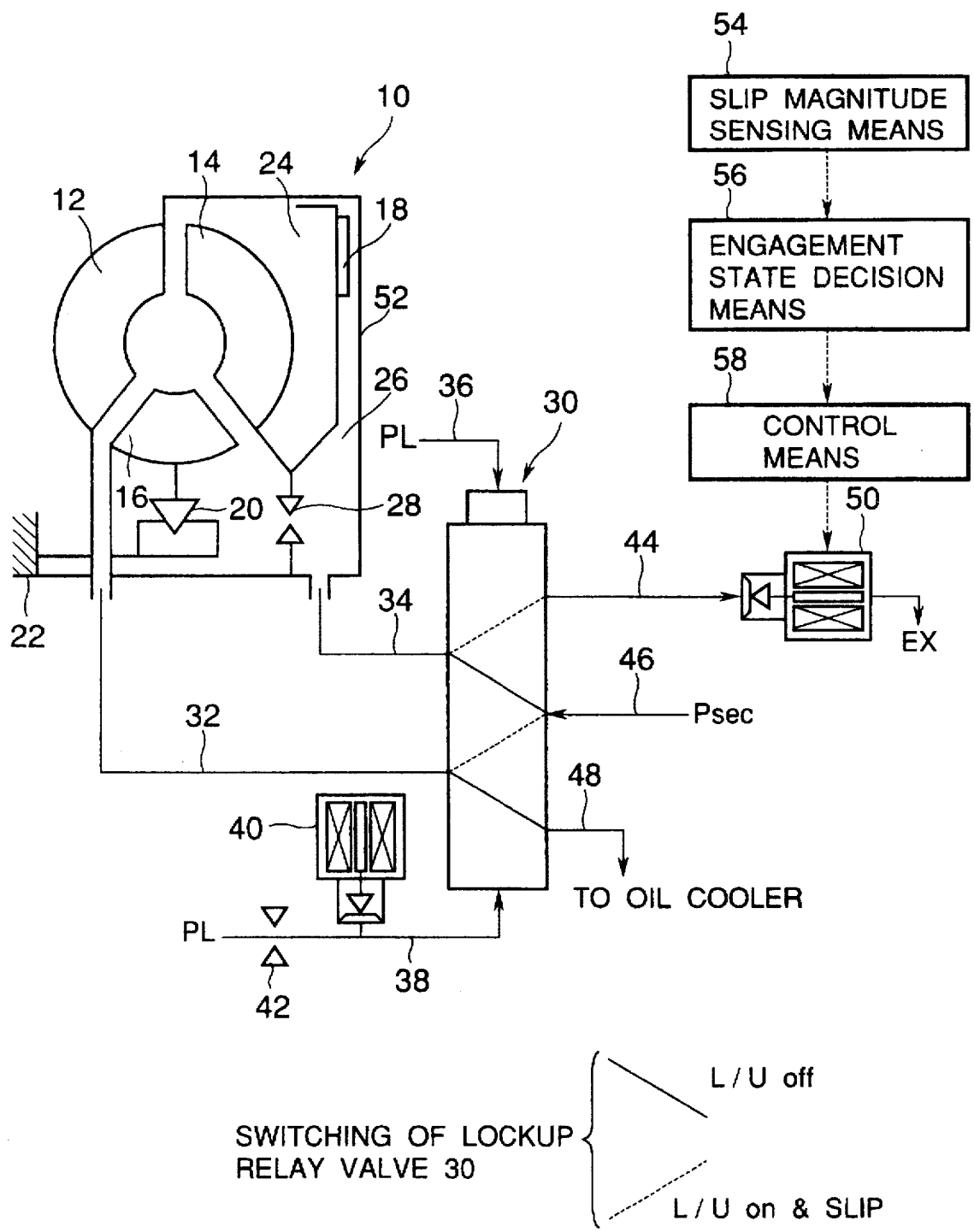
FIG. 1 is a schematic layout diagram showing the slip control system of a lockup clutch in the first aspect of performance (embodiment) of the present invention.

FIG. 1 is a schematic layout diagram showing the slip control system of a lockup clutch in the first aspect of performance of the present invention.

Referring to FIG. 1, a torque converter 10 includes a pump impeller (an input element) 12, a turbine (an output element) 14, a stator 16 and a lockup clutch 18. The pump impeller 12 is rotated in connection with the crankshaft of an engine, not shown. The turbine 14 is rotated by receiving that stream of working oil which is generated by the rotation of the pump impeller 12. The stator 16 is located between the turbine 14 and the pump impeller 12 and is fixed to a housing 22 being a non-rotary member through a one-way clutch 20.

The torque converter 10 also includes an engagement side oil chamber 24 and a release side oil chamber 26. An orifice 28 is provided between the engagement side oil chamber 24 and the release side oil chamber 26. Besides, a lockup relay valve 30 is disposed in the state in which it is connected with the engagement side oil chamber 24 by an oil passage 32, and with the release side oil chamber 26 by an oil passage 34. The lockup relay valve 30 switches the engagement state of the lockup clutch 18 by supplying the working oil into one of the engagement side oil chamber 24 and the release side oil chamber 26 and exhausting the working oil from the other. This lockup relay valve 30 is supplied with the line pressure PL from the side of an oil passage 36. Further, a switching solenoid 40 and an orifice 42 for switching the operation of the lockup relay valve 30 is disposed in an oil passage 38, and the line pressure PL is selectively supplied in the oil passage 38.

Three oil passages 44, 46 and 48 are connected to the lockup relay valve 30, in addition to the oil passages 32, 34, 36 and 38 mentioned above. The oil passage 44 is an exhaust oil passage for exhausting the working oil. The oil passage 46 is a supply oil passage for supplying the working oil of secondary pressure Psec (which is the basic or reference pressure of the working oil). Further, the oil passage 48 serves to conduct the working oil into an oil cooler, not shown. The exhaust oil passage 44 is furnished with a duty solenoid 50 which performs the slip control of the lockup clutch 18 by controlling the quantity of the working oil to be exhausted.

Incidentally, numeral 52 in FIG. 1 designates a front cover which constitutes the torque converter 10. Slip magnitude sensing means 54 senses the magnitude of the slip between the pump impeller (input element) 12 and turbine (output element) 14 of the torque converter 10. Engagement state decision means 56 judges whether or not the engagement state of the lockup clutch 18 has fallen into a predetermined state, on the basis of the sensed slip magnitude. Control means 58 calculates the desired value of the slip magnitude, and delivers a duty factor (ratio) correspondent to the desired value into the duty solenoid 50. The duty solenoid 50 receives the duty factor output from the control means 58 and then controls the quantity of exhaust of the working oil, in the state in which the lockup relay valve 30 has been switched to its position for exhausting the working oil out of the release side oil chamber 26.

The operation of the first aspect of performance will be explained below.

In a lockup-off mode (at the release of the lockup clutch 18), the lockup relay valve 30 is switched as indicated by solid lines in FIG. 1 by the actuation of the switching solenoid 40, so that the working oil under the secondary pressure Psec is introduced into the release side oil chamber 26 through the oil passage 46 and the oil passage 34. On this occasion, the working oil within the engagement side oil chamber 24 is exhausted into the unshown oil cooler through the oil passage 32 and the oil passage 48. As a result, the lockup clutch 18 is brought away from the front cover 52 to fall into its released state.

In a lockup-on mode (at the engagement of the lockup clutch 18), the lockup relay valve 30 is switched as indicated by broken lines in the figure, by the switching solenoid 40, so that the working oil under the secondary pressure Psec is introduced into the engagement side oil chamber 24 through the oil passage 46 and the oil passage 32. On the other hand, the working oil within the release side oil chamber 26 is exhausted through the oil passage 34 and the oil passage 44. Therefore, the lockup clutch 18 is pressed against the front cover 52 to fall into its engaged state.

Besides, the slip control which corresponds to the intermediate state between the released and engaged states is performed as follows: The control means 58 delivers the duty factor to the duty solenoid 50 in accordance with the information items of the slip magnitude sensing means 54 and the engagement state decision means 56. The duty solenoid 50 adjusts the quantity of bleed of the working oil to be exhausted out of the release side oil chamber 26, on the basis of the duty factor which is delivered from the control means 58. Thus, the hydraulic pressure of the working oil within the release side oil chamber 26 is regulated in a range of zero (perfect lockup) to the secondary pressure Psec.

Figure 2:
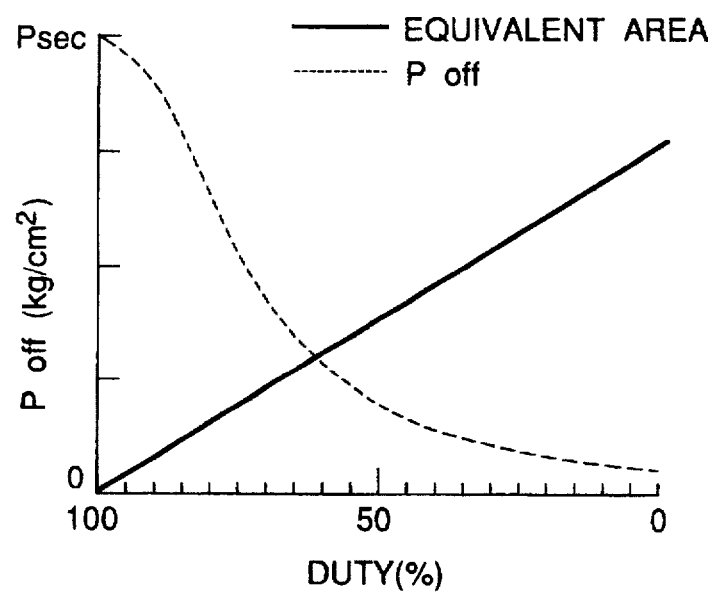
FIG. 2 is a graph showing the relationship between a duty factor and a hydraulic pressure within a release side oil chamber.

The relationship between the duty factor and the hydraulic pressure within the release side oil chamber 26 is illustrated in FIG. 2. Here, letting symbol A1 denote the area of the orifice 28 and symbol A2 denote the equivalent area of the duty solenoid 50, the hydraulic pressure Poff within the release side oil chamber 26 is computed by a formula; $Poff = A^2 \cdot Psec/(A1^2 + A2^2)$. The slip control of the lockup clutch 18 is performed with reference to the secondary pressure Psec. Herein, in a case where the secondary pressure Psec has lowered due to any cause by way of example, the hydraulic pressure within the release side oil chamber 26 is lowered, whereby the difference between the secondary pressure Psec and the hydraulic pressure within the release side oil chamber 26 is controlled so as to keep a constant ratio at all times. Accordingly, although the control based on the example of this aspect of performance is not a lockup-ON/OFF differential-pressure control system in the strict sense, it is very close to the differential-pressure control.

The orifice 28 functions to prevent the generation of heat during the slip control by circulating the working oil, and to supply the hydraulic pressure for the regulation of the pressure within the release side oil chamber 26.

In this manner, the first aspect of performance has attained the reduced cost of the slip control system and the smaller size and lighter weight of a valve body by substituting the single duty solenoid 50 for the two valves of the electromagnetic solenoid and the slip control valve involved in the prior art.

By the way, in the case where the duty solenoid 50 is a two-way duty solenoid as understood from the foregoing, it has the merits of ease in ensuring a quantity of flow, immunity against foreign matters, and of low cost. Moreover, in case of specifying the duty solenoid 50 to be of the normally-open type, a slip control system becomes more reliable by reason that, even if the duty solenoid 50 has failed, the turn-ON/OFF of the lockup clutch 18 can be controlled by switching the lockup relay valve 30 through the switching solenoid 40.

Incidentally, the details of the slip control will be explained later.

Next the second aspect of performance of the present invention will be described.

Figure 3:
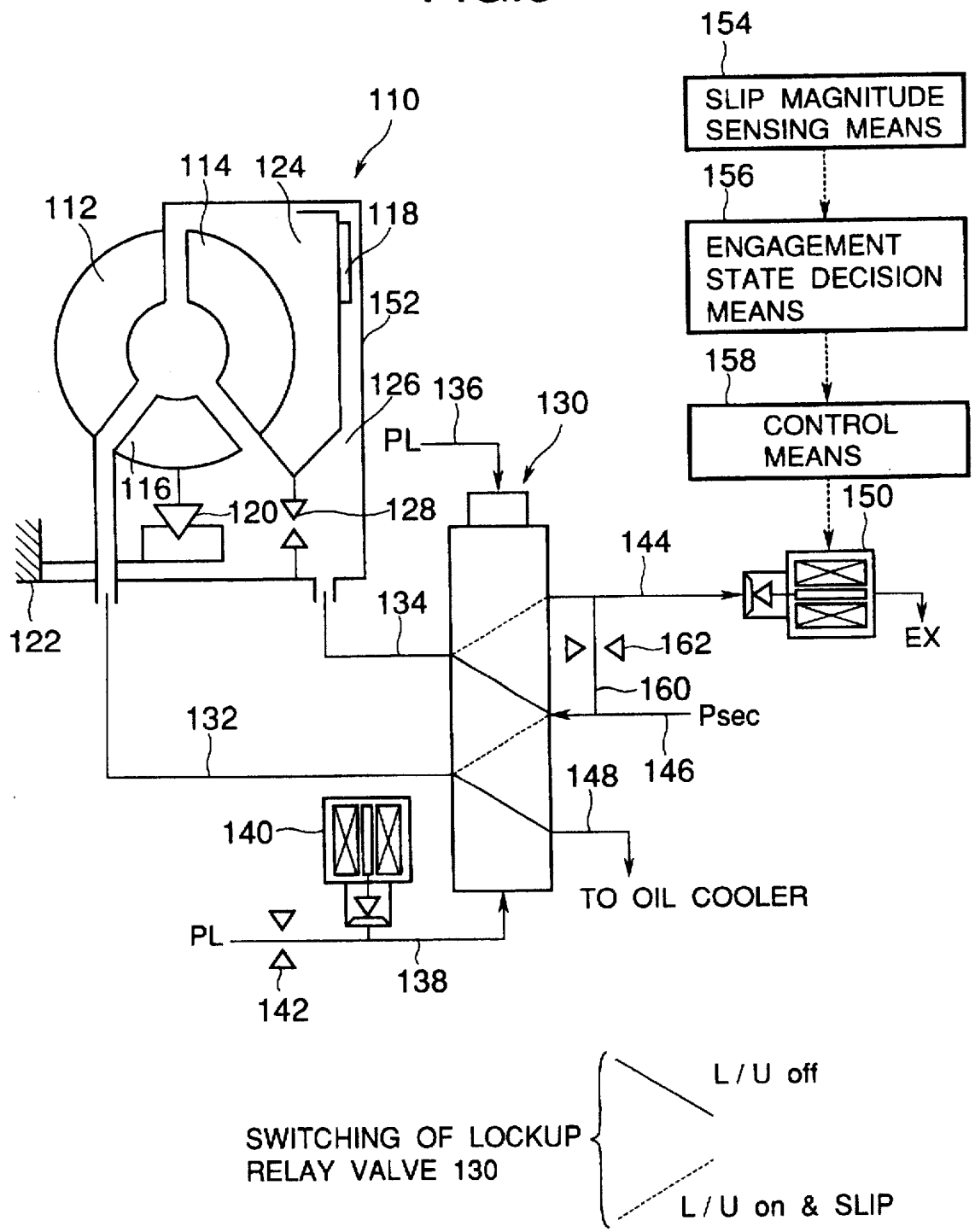
FIG. 3 is a schematic layout diagram showing the slip control system of a lockup clutch in the second aspect of performance of the present invention.

FIG. 3 is a schematic layout diagram showing the slip control system of a lockup clutch in the second aspect of performance.

Since the second aspect of performance is basically the same as the first aspect of performance stated above, numerals each having the same two lower digits shall be assigned to identical or similar parts in FIG. 3, and only different parts shall be explained.

The point of difference of the second aspect of performance from the first one is that, as illustrated in FIG. 3, an oil passage 160 for connecting the oil passages 144 and 146 is laid, an orifice 162 being provided midway of the oil passage 160.

In general, a duty solenoid has the problem that the control responsibility thereof is low at and near duty factors of 100 (%) and 0 (%), resulting in an inferior linearity. In this regard, according to the second aspect of performance, the working oil is caused to flow into the duty solenoid 150 from the oil passage 160 including the orifice 162 therein. Therefore, the quantity of flow from the release side oil chamber 126 into the duty solenoid 150 via the oil passages 134 and 144 decreases to that extent. It is consequently permitted to avoid operating the duty solenoid 150 at and near the duty factor of 100 (%). Thus, the controllability of the slip control is enhanced.

Incidentally, since the remaining construction and operation of this aspect of performance are similar to those of the first aspect of performance, they shall be omitted from description.

Next, the third aspect of performance of the present invention will be described.

Figure 4:
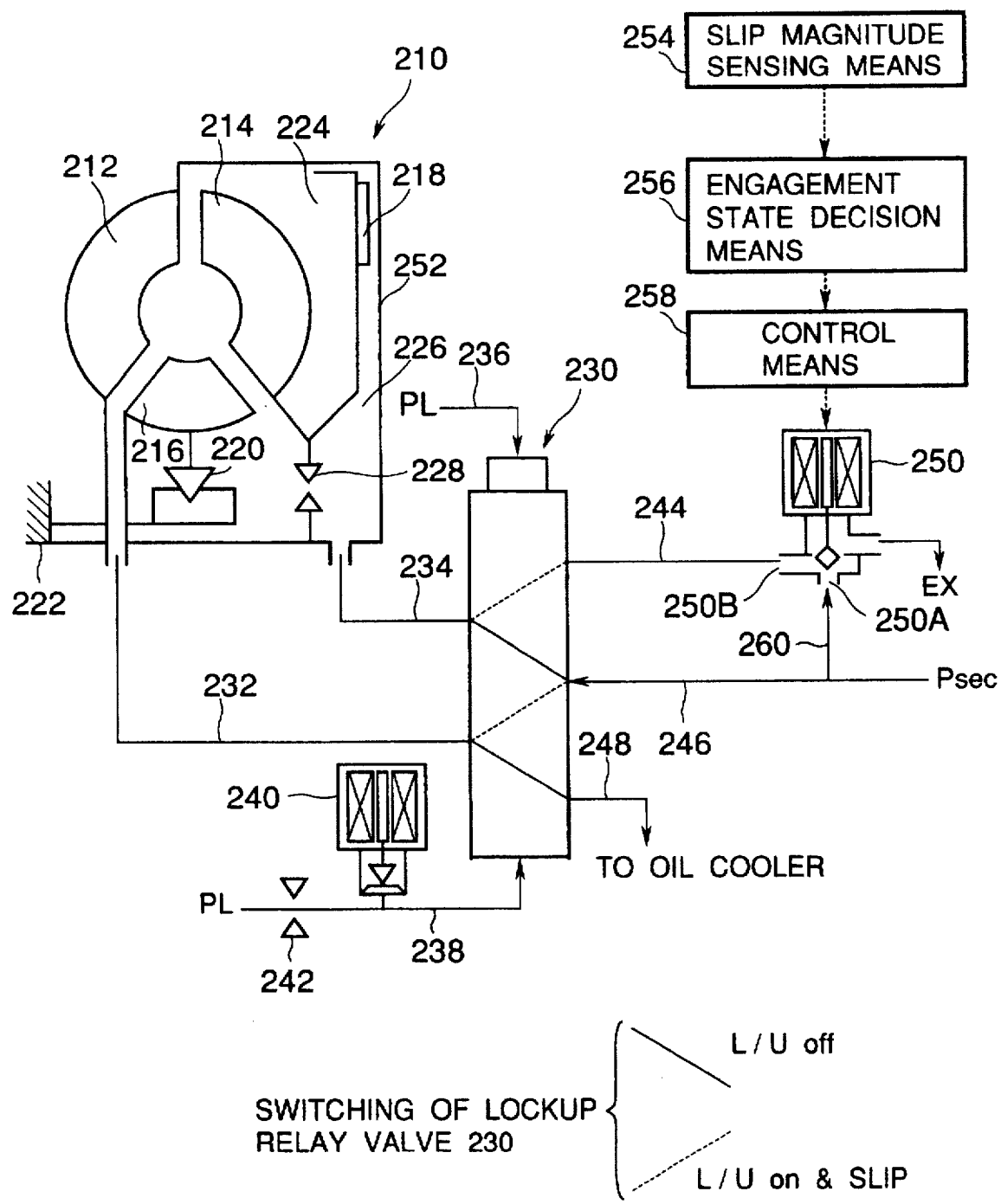
FIG. 4 is a schematic layout diagram showing the slip control system of a lockup clutch in the third aspect of performance of the present invention.

FIG. 4 is a schematic layout diagram showing the slip control system of a lockup clutch in the third aspect of performance.

Also on the third aspect of performance, numerals each having the same two lower digits shall be assigned in FIG. 4 to parts identical or similar to those of the first aspect of performance, without the repeated explanation of the parts, and only different parts shall be explained.

As illustrated in FIG. 4, the point of difference of the third aspect of performance from the first one is that the duty solenoid 250 is specified to be a three-way duty solenoid, and that an oil passage 260 for connecting the oil passage 246 and the three-way duty solenoid 250 is laid, whereby the quantity of bleed of the working oil within the release side oil chamber 226 is controlled by the three-way duty solenoid 250.

The three-way duty solenoid 250 executes a duty control for the change-over between the exhaust of the working oil through the oil passage 260 (a port 250A) and the exhaust thereof through the oil passage 244 (a port 250B). Using the three-way duty solenoid 250, accordingly, the duty factor of and near 100 (%) is avoided in the same manner as in the second aspect of performance, whereby the controllability of the duty control can also be improved.

In the second aspect of performance, the working oil of the oil passage 160 and that of the oil passage 134 must be simultaneously caused to flow, and hence, a residual pressure is left behind within the release side oil chamber 126. In contrast, according to the third aspect of performance, in the case where the three-way duty solenoid 250 functions to exhaust the working oil of the oil passage 244, the working oil within the release side oil chamber 226 continues to be exhausted through the oil passages 234 and 244, so that any residual pressure is not left behind within the release side oil chamber 226. Moreover, the duty control by the three-way duty solenoid 250 has the merit that the consumptive quantity of flow is smaller.

Now, the slip control will be detailed.

Figure 5:
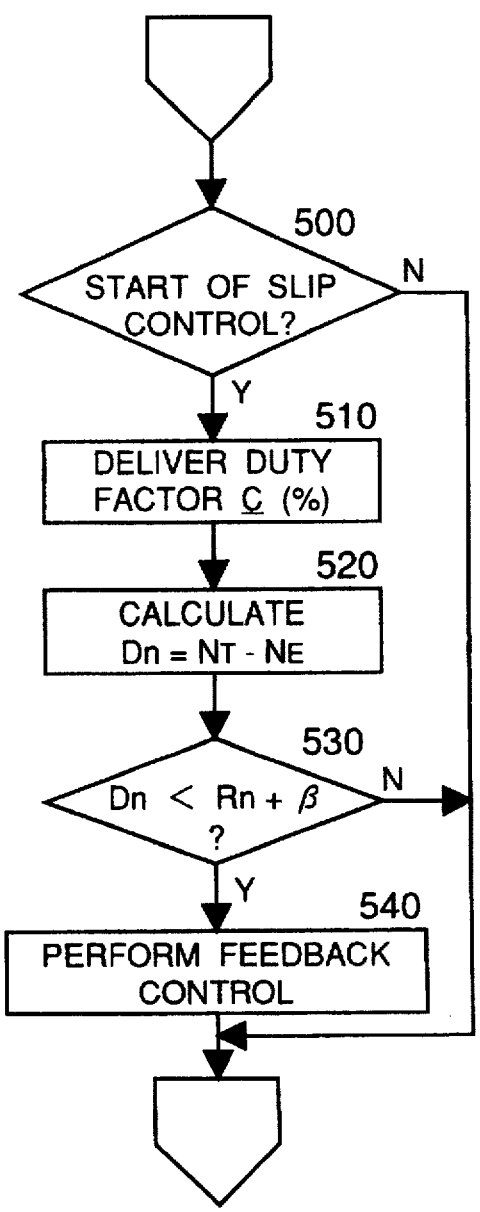
FIG. 5 is a flow chart showing the first slip control of the present invention.

FIG. 5 is a flow chart showing the first aspect of the slip control. In addition, FIG. 6 is a graph showing change in the rotational speed difference (the slip magnitude) Dn between the rotational speed of an engine (or that of a pump) and that of a turbine, and changes in the piston stroke and duty command value of a lockup clutch in the first slip control.

Figure 6:
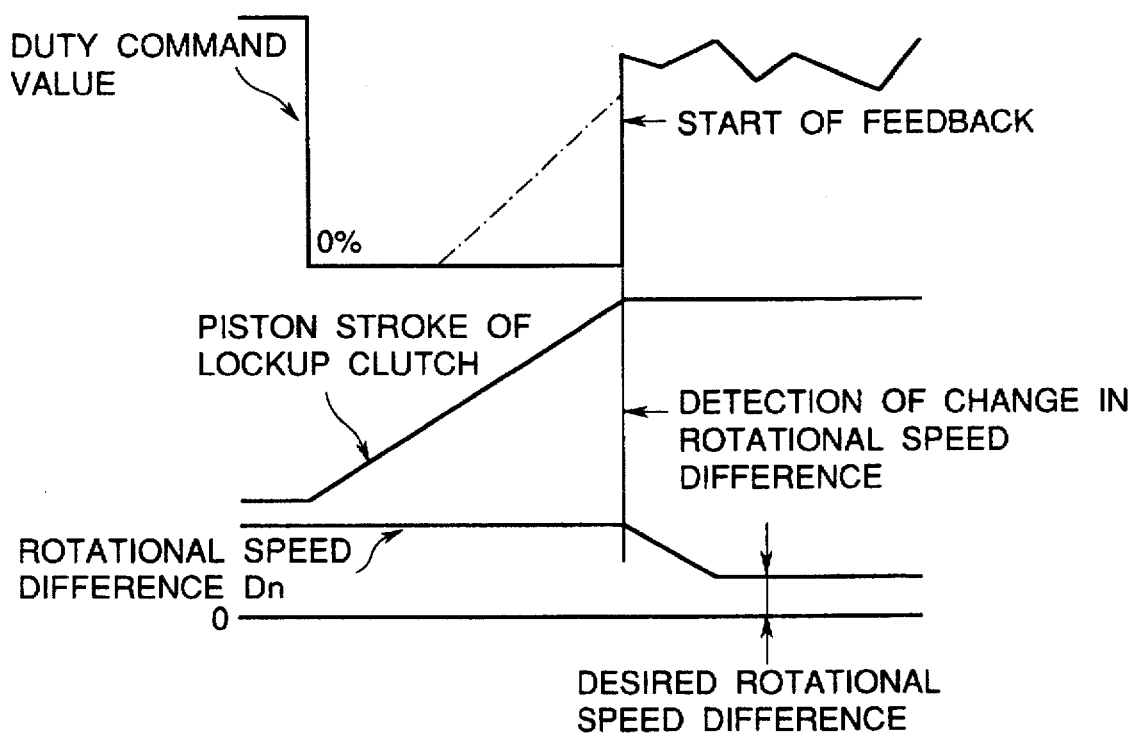
FIG. 6 is a graph showing the changes of a duty command value, etc. in the first slip control.

In case of starting the slip control of the lockup clutch 18, 118 or 218 at a step 500 in FIG. 5, an initial duty factor c (%) (for example, zero (%) as indicated in FIG. 6) is outputted at a step 510, thereby to start the engagement of the clutch. This signifies that, in the piston stroke state of the lockup clutch 18, 118 or 218, the hydraulic pressure of the working oil within the release side oil chamber 26, 126 or 226 is fed forward so as to become low.

The lockup clutch 18, 118 or 218 is gradually moved to the side of the front cover 52, 152 or 252, and the clutch engagement is started in due course. The start of the clutch engagement is sensed by detecting the change of the rotational speed difference (the slip magnitude) Dn between the rotational speed NE of the engine and that NT of the turbine.

More specifically, the slip magnitude Dn=NT−NE is sensed by the slip magnitude sensing means 54, 154 or 254 at a step 520, and the change of the slip magnitude Dn is detected by the engagement state decision means 56, 156 or 256 at the next step 530. At this step 530, the change of the slip magnitude Dn is detected depending upon whether or not the slip magnitude Dn is smaller than a sum value which is obtained by adding a predetermined constant B to a desired slip magnitude Rn, that is, whether or not an inequality Dn<Rn+β is held.

Figure 7:
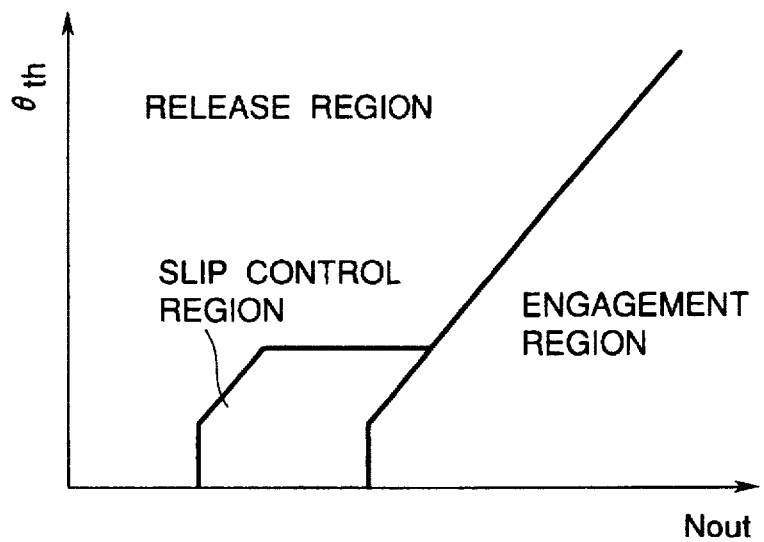
FIG. 7 is an explanatory diagram showing the relationship between the drive state of a motor vehicle and the engagement state of the lockup clutch.
Figure 8:
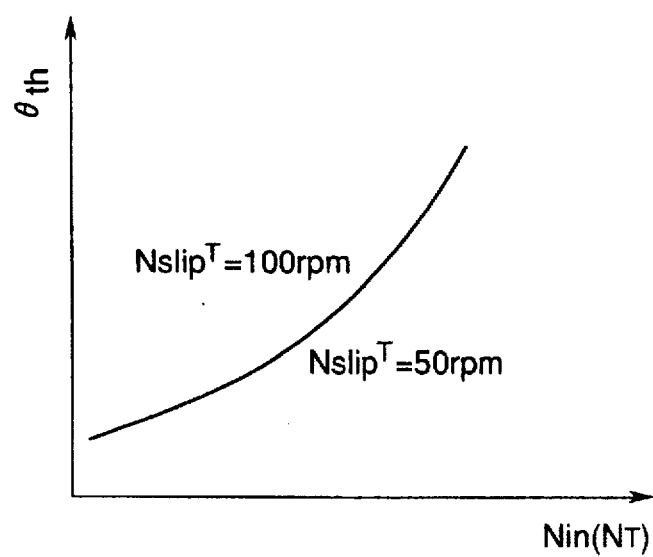
FIG. 8 is a graph showing a relationship for determining a desired slip rotational speed.

Here, the desired slip magnitude Rn is given by a known method in accordance with relationships illustrated in FIGS. 7 and 8. More specifically, which of a release region, a slip control region and an engagement region the lockup clutch 18, 118 or 218 should be laid in, is first judged on the basis of the drive conditions of a motor vehicle, for example, the rotational speed Nout of an output shaft (namely, the speed of the motor vehicle) and the degree of opening θth of a throttle valve, in accordance with the relationship shown in FIG. 7. In the case of this figure, the slip control region is set on the release region side of the output-shaft rotational speed Nout with respect to the boundary line between the engagement region and the release region, and on the low side of the throttle-valve opening degree θth. In the slip control region, the fluctuation of an engine torque is absorbed with the merit of lockup kept so as to improve fuel consumption without spoiling the drivability of the motor vehicle.

When the drive conditions of the motor vehicle have been judged to lie in the slip control region, the lockup relay valve 30, 130 or 230 is switched by the associated switching solenoid 40, 140 or 240, and the lockup clutch 18, 118 or 218 is slipped and controlled by the duty control of the associated duty solenoid 50, 150 or 150.

Meantime, a desired slip rotational speed $Nslip^T$ (the desired slip magnitude Rn) is determined from the turbine rotational speed NT on the basis of the relationship shown in FIG. 8.

Referring back to FIG. 5, when the inequality Dn<Rn+β has been held at the step 530, the detection of the change of the slip magnitude Dn, namely, the change of the rotational speed difference is recognized. Subsequently, the control of the flow chart proceeds to a step 540, at which the lockup clutch 18, 118 or 218 is slipped and controlled by the duty control of the associated duty solenoid 50, 150 or 150 conforming to the output of the corresponding control means 58, 158 or 258. The slip control is performed by a feedback control in order that the desired slip magnitude Rn may be accomplished.

On the other hand, when the detection of the change of the rotational speed difference is not recognized at the step 530, the first slip control exits from the control of the flow chart without further processing.

According to the first slip control, in the piston stroke state of the lockup clutch 18, 118 or 218 preceding the certain engagement state thereof, the hydraulic pressure of the working oil within the pertinent release side oil chamber 26, 126 or 226 is subjected to the feedforward control so as to become low. Thus, the lockup clutch 18, 118 or 218 can be quickly brought near to the side of the corresponding front cover 52, 152 or 252. As a result, the slip magnitude Dn can be quickly approximated to the desired slip magnitude Rn.

Incidentally, here in the first slip control, the output of the duty factor c (%) at the step 510 may well be delivered as indicated by a dot-and-dash line in FIG. 6. Thus, a shock can be prevented from occurring at the time of the clutch engagement.

Figure 9:
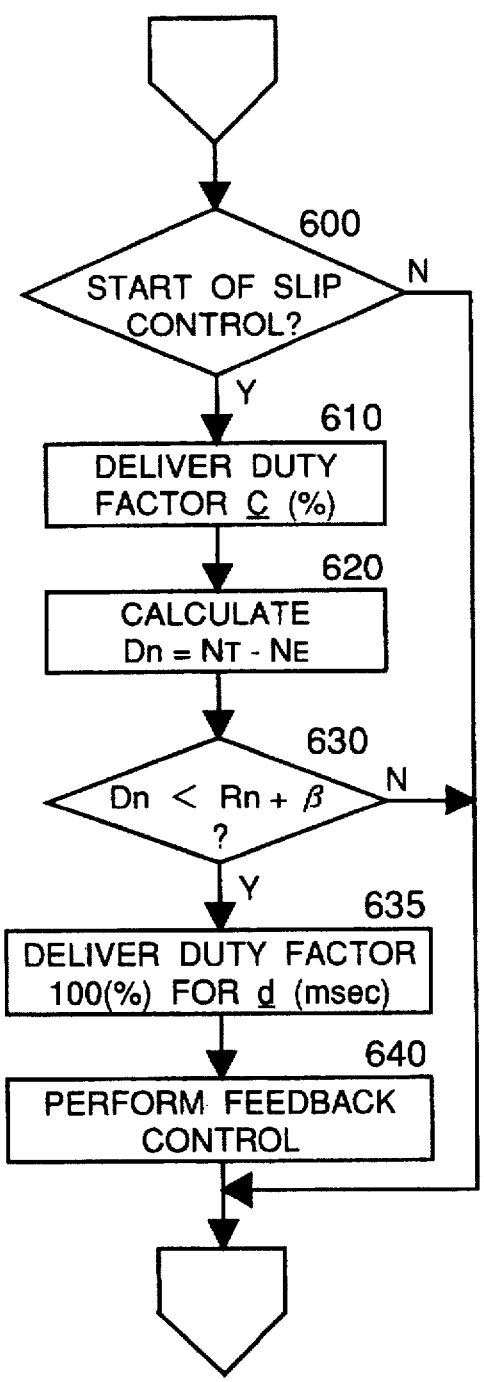
FIG. 9 is a flow chart showing the second slip control of the present invention.
Figure 10:
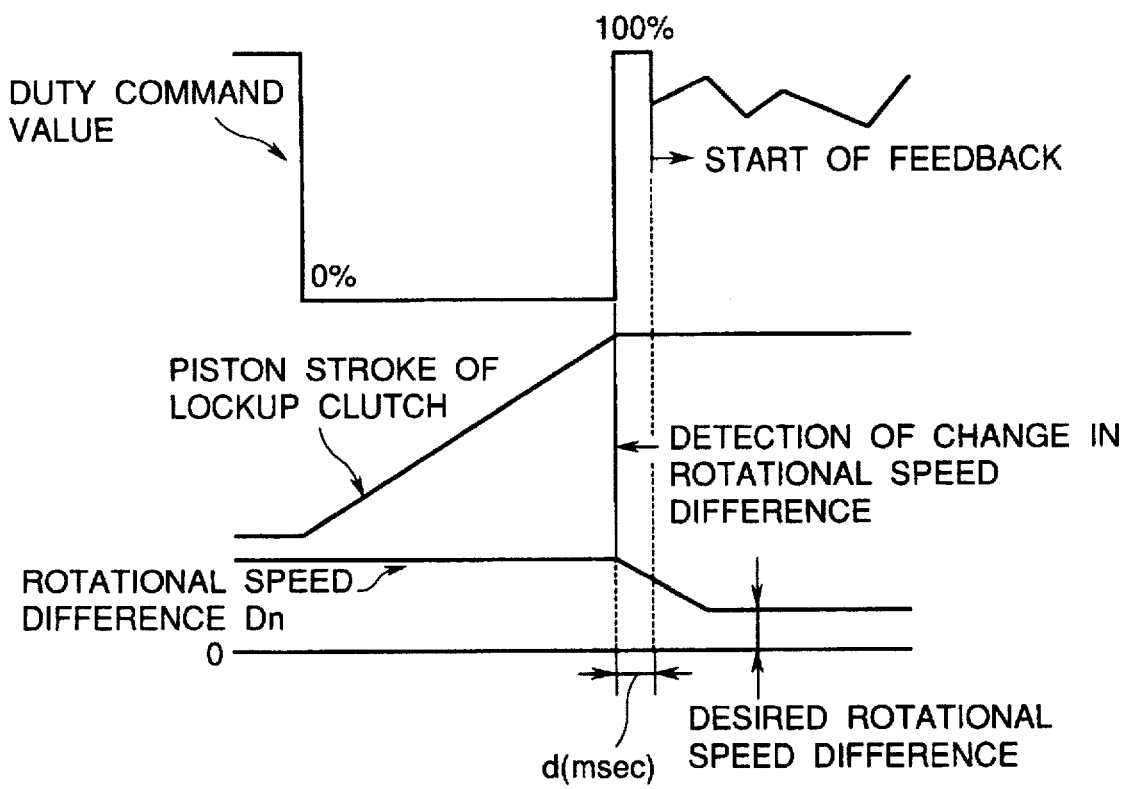
FIG. 10 is a graph showing the changes of a duty command value, etc. in the second slip control.

FIG. 9 is a flow chart showing the second aspect of the slip control. In addition, FIG. 10 is a graph showing change in the rotational speed difference (the slip magnitude) Dn between the rotational speed of an engine and that of a turbine, and changes in the piston stroke and duty command value of a lockup clutch in the second slip control.

Regarding FIG. 9, the same control steps as in the first slip control shown in FIG. 5 shall be omitted from explanation by assigning step Nos. of identical two lower digits thereto. The point of difference of the second slip control from the first one is that a step 635 for outputting a duty factor of 100 (%) for d (msec) is inserted between the step 630 for detecting the change of the rotational speed difference and the step 640 for performing the feedback control.

More specifically, when the start of the clutch engagement has been recognized at the step 630, the duty factor is once set at 100 (%) and outputted for d (msec) at the step 635. Thereafter, the control of the flow chart proceeds to the step 640, at which the feedback control is started. In this manner, the duty factor of 100 (%) is once outputted, whereby the lockup clutch 18, 118 or 218 can be prevented from coming into sudden engagement, and the shock at the time of the clutch engagement can be relieved.

As described above, according to the present invention, the slip control system of a lockup clutch can attain the reduced cost thereof and the smaller size and lighter weight of a valve body.

What is claimed is:

1. A slip control system of a lockup clutch wherein the lockup clutch is slipped and controlled in accordance with hydraulic pressures of working oil within an engagement side oil chamber and a release side oil chamber in order that a magnitude of a slip between an input element and an output element may be brought to a desired value, comprising:

an orifice which is provided between said engagement side oil chamber and said release side oil chamber;

control means for calculating the desired value and for outputting as an output a duty factor correspondent to the calculated desired value; and a duty solenoid which is disposed in an exhaust oil passage for the working oil to be exhausted out of said release side oil chamber, and which receives the duty factor outputted from said control means and then controls a quantity of exhaust in a state where said working oil is to be exhausted out of said release side oil chamber.

2. A slip control system of a lockup clutch as defined in claim 1, further comprising:

a switching solenoid; and a lockup relay valve which supplies the working oil into one of said engagement side oil chamber and said release side oil chamber and exhausts the working oil from within the other in response to actuation of said switching solenoid, so as to switch an engagement state of said lockup clutch;

wherein the state where said working oil is to be exhausted out of said release side oil chamber is established by said lockup relay valve.

3. A slip control system of a lockup clutch as defined in either of claims 1 and 2, wherein said duty solenoid is a two-way duty solenoid, and a hydraulic-pressure supplying oil passage which supplies the working oil through an orifice is connected to said exhaust oil passage which is located upstream of said duty solenoid.

4. A slip control system of a lockup clutch as defined in either of claims 1 and 2, wherein said duty solenoid is a three-way duty solenoid, and a hydraulic-pressure supplying oil passage which supplies the working oil is connected to one of ports of said three-way duty solenoid.

5. A slip control system of a lockup clutch as defined in either of claims 1 and 2, further comprising:

means for sensing the slip magnitude between said input element and said output element; and means for judging whether or not said lockup clutch has fallen into a predetermined engagement state, on the basis of the sensed slip magnitude;

wherein said control means outputs a duty factor for lowering the hydraulic pressure within said release side oil chamber, to said duty solenoid irrespective of said calculated desired value for a time period since start of the slip control till the judgement that said lockup clutch has fallen into the predetermined engagement state.

6. A slip control system of a lockup clutch as defined in claim 5, wherein said control means outputs a duty factor for heightening said hydraulic pressure within said release side oil chamber, to said duty solenoid irrespective of said calculated desired value until a predetermined time period lapses since said judgement.

7. A slip control system of a lockup clutch as defined in claim 2, further comprising:

means for sensing the slip magnitude between said input element and said output element; and means for judging whether or not said lockup clutch has fallen into a predetermined engagement state, on the basis of the sensed slip magnitude;

wherein said control means outputs a duty factor for lowering the hydraulic pressure within said release side oil chamber, to said duty solenoid irrespective of said calculated desired value for a time period since start of the slip control till the judgement that said lockup clutch has fallen into the predetermined engagement state, and said duty solenoid is a two-way duty solenoid, and a hydraulic-pressure supplying oil passage which supplies the working oil through an orifice is connected to said exhaust oil passage which is located upstream of said duty solenoid.

8. A slip control system of a lockup clutch as defined in claim 7, wherein said control means outputs a duty factor for heightening said hydraulic pressure within said release side oil chamber, to said duty solenoid irrespective of said calculated desired value until a predetermined time period lapses since said judgement.

9. A slip control system of a lockup clutch as defined in claim 2, further comprising:

means for sensing the slip magnitude between said input element and said output element; and means for judging whether or not said lockup clutch has fallen into a predetermined engagement state, on the basis of the sensed slip magnitude;

wherein said control means outputs a duty factor for lowering the hydraulic pressure within said release side oil chamber, to said duty solenoid irrespective of said calculated desired value for a time period since start of the slip control till the judgement that said lockup clutch has fallen into the predetermined engagement state, and said duty solenoid is a three-way duty solenoid, and a hydraulic-pressure supplying oil passage which supplies the working oil is connected to one of ports of said three-way duty solenoid.

10. A slip control system of a lockup clutch as defined in claim 9, wherein said control means outputs a duty factor for heightening said hydraulic pressure within said release side oil chamber, to said duty solenoid irrespective of said calculated desired value until a predetermined time period lapses since said judgement.

11. A slip control system of a lockup clutch as defined in claim 1, further comprising:

means for sensing the slip magnitude between said input element and said output element; and means for judging whether or not said lockup clutch has fallen into a predetermined engagement state, on the basis of the sensed slip magnitude;

wherein said control means outputs a duty factor for lowering the hydraulic pressure within said release side oil chamber, to said duty solenoid irrespective of said calculated desired value for a time period since start of the slip control till the judgement that said lockup clutch has fallen into the predetermined engagement state, and said duty cycle solenoid is a two-way duty solenoid, and a hydraulic-pressure supplying oil passage which supplies the working oil through an orifice is connected to said exhaust oil passage which is located upstream of said duty solenoid.

12. A slip control system of a lockup clutch as defined in claim 11, wherein said control means outputs a duty factor for heightening said hydraulic pressure within said release side oil chamber, to said duty solenoid irrespective of said calculated desired value until a predetermined time period lapses since said judgement.

13. A slip control system of a lockup clutch as defined in claim 1, further comprising:

means for sensing the slip magnitude between said input element and said output element; and means for judging whether or not said lockup clutch has fallen into a predetermined engagement state, on the basis of the sensed slip magnitude;

wherein said control means outputs a duty factor for lowering the hydraulic pressure within said release side oil chamber, to said duty solenoid irrespective of said calculated desired value for a time period since start of the slip control till the judgement that said lockup clutch has fallen into the predetermined engagement state, and said duty solenoid is a three-way duty solenoid, and a hydraulic-pressure supplying oil passage which supplies the working oil is connected to one of ports of said three-way duty solenoid.

14. A slip control system of a lockup clutch as defined in claim 13, wherein said control means outputs a duty factor for heightening said hydraulic pressure within said release side oil chamber, to said duty solenoid irrespective of said calculated desired value until a predetermined time period lapses since said judgement.

* * * * *